(12) United States Patent
Shi

(10) Patent No.: US 11,546,945 B2
(45) Date of Patent: Jan. 3, 2023

(54) DATA TRANSMISSION METHOD AND APPARATUS, AND TERMINAL

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 94 days.

(21) Appl. No.: 17/166,958

(22) Filed: Feb. 3, 2021

(65) Prior Publication Data
US 2021/0160931 A1    May 27, 2021

Related U.S. Application Data

(63) Continuation of application No. PCT/CN2018/109451, filed on Oct. 9, 2018.

(30) Foreign Application Priority Data

Aug. 20, 2014    (CN) ................. PCT/CN2018/100509
Aug. 9, 2018    (CN) ................. PCT/CN2018/099717

(51) Int. Cl.
*H04W 74/08*      (2009.01)
*H04W 24/08*      (2009.01)
(Continued)

(52) U.S. Cl.
CPC ....... *H04W 74/0833* (2013.01); *H04W 24/02* (2013.01); *H04W 24/08* (2013.01);
(Continued)

(58) Field of Classification Search
None
See application file for complete search history.

(56) References Cited

U.S. PATENT DOCUMENTS 9,706,580 B2    7/2017   Lee et al.
10,701,734 B2*   6/2020   Shih .................... H04W 74/004
(Continued)

FOREIGN PATENT DOCUMENTS

CN      101674661 A    3/2010
CN      101803234 A    8/2010
(Continued)

OTHER PUBLICATIONS

The Second Office Action issued in corresponding Chinese Application No. 202010657801.0, dated Oct. 9, 2021, 15 pages.
(Continued)

*Primary Examiner* — Gregory B Sefcheck
(74) *Attorney, Agent, or Firm* — Bayes PLLC

(57) ABSTRACT

The embodiments of the present disclosure provide a data transmission method and apparatus, and a terminal. The method includes a terminal sending a first preamble to a base station and receiving a first random access response message sent by the base station. The method further includes the terminal acquiring an uplink transmission resource based on the first random access response message and transmitting first uplink data on the uplink transmission resource. The size of the uplink transmission resource supports the transmission of the first uplink data.

12 Claims, 3 Drawing Sheets

(51) Int. Cl.
*H04W 28/06* (2009.01)
*H04W 72/04* (2009.01)
*H04W 24/02* (2009.01)
*H04W 74/00* (2009.01)

(52) U.S. Cl.
CPC ....... *H04W 28/06* (2013.01); *H04W 72/0413* (2013.01); *H04W 74/006* (2013.01)

(56) References Cited

U.S. PATENT DOCUMENTS

| | | | |
|---|---|---|---|
| 2011/0085509 | A1 | 4/2011 | Park et al. |
| 2017/0099660 | A1 | 4/2017 | Oh |
| 2017/0273113 | A1 | 9/2017 | Tirronen et al. |
| 2018/0270869 | A1* | 9/2018 | Tsai ................ H04W 76/27 |
| 2018/0317263 | A1* | 11/2018 | Ishii ................ H04W 74/0833 |
| 2018/0343673 | A1* | 11/2018 | Chen ................ H04W 74/006 |
| 2019/0191464 | A1* | 6/2019 | Loehr ............... H04W 28/0278 |
| 2019/0200248 | A1* | 6/2019 | Basu Mallick ........ H04B 7/088 |
| 2019/0320430 | A1* | 10/2019 | Kim ................ H04L 27/2607 |
| 2019/0364605 | A1* | 11/2019 | Loehr ............... H04L 5/003 |
| 2020/0008240 | A1* | 1/2020 | Golitschek Edler von Elbwart ... H04W 24/08 |
| 2020/0053793 | A1* | 2/2020 | Loehr ................ H04W 72/042 |
| 2020/0077451 | A1* | 3/2020 | You .................. H04W 72/0453 |
| 2020/0178318 | A1* | 6/2020 | Yu ................... H04W 72/0446 |
| 2021/0058947 | A1* | 2/2021 | Lin ................... H04W 74/008 |
| 2021/0105813 | A1* | 4/2021 | Lee ................... H04W 74/0833 |
| 2021/0194756 | A1* | 6/2021 | Babaei ............... H04W 74/0808 |
| 2021/0195657 | A1* | 6/2021 | Wu .................... H04L 5/0044 |
| 2022/0039068 | A1* | 2/2022 | Hoglund .............. H04W 76/20 |

FOREIGN PATENT DOCUMENTS

| | | |
|---|---|---|
| CN | 101978763 A | 2/2011 |
| CN | 102006633 A | 4/2011 |
| CN | 103517335 A | 1/2014 |
| CN | 103582054 A | 2/2014 |
| CN | 103797869 A | 5/2014 |
| CN | 104105214 A | 10/2014 |
| CN | 106131969 A | 11/2016 |
| CN | 106470381 A | 3/2017 |
| CN | 107347216 A | 11/2017 |
| CN | 108112041 A | 6/2018 |
| WO | 2020/029310 A1 | 2/2020 |
| WO | 2020/029415 A1 | 2/2020 |

OTHER PUBLICATIONS

Extended Search Report issued in corresponding European Application No. 18929328.5, dated Aug. 26, 2021, 12 pages.

"Msg3 handling when switching from CBRA to CFRA", Agenda item: 10.3.1.4.2, Source: Nokia, Nokia Shanghai Bell, 3GPP TSG-RAN WG2 Meeting NR Adhoc 1807, R2-1810157, Montreal, Canada, Jul. 2-6, 2018, 3 pages.

"UE switch from CBRA to CFRA and possible issues", Agenda Item: 10.3.1.4.3, Source: Ericsson, 3GPP TSG-RAN WG2 AH 1807, Tdoc R2-1810084, Montreal, Canada, Jul. 2-6, 2018, 2 pages.

PCT Written Opinion of The International Searching Authority issued in corresponding International Application No. PCT/CN2018/100509, dated Mar. 25, 2019, 9 pages.

PCT Written Opinion of The International Searching Authority issued in corresponding International Application No. PCT/CN2018/109451, dated Apr. 9, 2019, 9 pages.

First Office Action issued in corresponding India Application No. 202127005090, dated Jan. 10, 2022, 6 pages.

Notice of Priority Review of Patent Application issued in corresponding Chinese Application No. 202010657801.0, dated Jun. 16, 2021, 6 page.

First Office Action issued in corresponding Chinese Application No. 202010657801.0, dated Jul. 13, 2021, 19 page.

"Introduction of EDT for eMTC in Rel-15 TS 36.321", Source to WG: Intel Corporation, Source to TSG: R2, Work item code: LTE_eMTC4-Core, 3GPP TSG RAN WG2 Meeting #101, R2-1803303, Athens, Greece, Feb. 26-Mar. 2, 2018, 15 pages.

"Introduction of EDT for eMTC and NB-IoT in Rel-15 TS 36.321", Source to WG: Intel Corporation, Ericsson, Source to TSG: R2, Work item code: LTE_eMTC4-Core, NB_IOTenh2, 3GPP TSG RAN WG2 Meeting #102, R2-1808865, Busan, Republic of Korea, May 21-25, 2018, 19 pages.

* cited by examiner

DATA TRANSMISSION METHOD AND APPARATUS, AND TERMINAL

CROSS-REFERENCE TO RELATED APPLICATIONS

The present application is a continuation of International Application No. PCT/CN2018/109451, filed on Oct. 9, 2018, which claims the benefit of priorities to International Application No. PCT/CN2018/099717, filed on Aug. 9, 2018, and International Application No. PCT/CN2018/100509, filed on Aug. 14, 2018, all of which are incorporated herein by reference in their entireties.

BACKGROUND

Embodiments of the present disclosure relate to the technical field of mobile communications, and more particularly relates to a method and apparatus for transmitting data, and a terminal.

When a terminal is in a connected state, a random access (RA) process would be triggered due to a switching event or a beam failure recovery (BFR) event, and the following cases exist in one triggered RA process: switching from a contention based random access (CBRA) to a contention free random access (CFRA), or from the CFRA to the CBRA.

Since the terminal may be switched between the CBRA and the CFRA in a same RA process, the size of an uplink transmission resource authorized in an msg2 cannot match the size of to-be-transmitted uplink data.

SUMMARY

Embodiments of the present disclosure provide a method and apparatus for transmitting data, and a terminal.

The method for transmitting data provided by the embodiment of the present disclosure includes transmitting, by a terminal, a first preamble to a base station, and receiving a first random access response (RAR) message transmitted by the base station; and obtaining, by the terminal, an uplink transmission resource based on the first RAR message, and transmitting first uplink data on the uplink transmission resource, where the size of the uplink transmission resource supports the transmission of the first uplink data.

The apparatus for transmitting data provided by the embodiment of the present disclosure includes a first transmitting unit, configured to transmit a first preamble to a base station; a first receiving unit, configured to receive a first random access response (RAR) message transmitted by the base station; and a second transmitting unit, configured to obtain an uplink transmission resource based on the first RAR message, and transmit first uplink data on the uplink transmission resource, where the size of the uplink transmission resource supports the transmission of the first uplink data.

The terminal provided by the embodiment of the present disclosure includes a processor and a memory. The memory is configured to store a computer program. The processor is configured to call and operate the computer program stored in the memory to perform the above method for transmitting data.

A chip provided by the embodiment of the present disclosure is configured to implement the above method for transmitting data.

Specifically, the chip includes a processor, configured to call and operate a computer program stored in a memory to enable a device equipped with the chip to perform the above method for transmitting data.

A computer-readable storage medium provided by the embodiment of the present disclosure is configured to store a computer program. The computer program enables a computer to perform the above method for transmitting data.

A computer program product provided by the embodiment of the present disclosure includes a computer program instruction. The computer program instruction enables a computer to perform the above method for transmitting data.

A computer program provided by the embodiment of the present disclosure is operated on a computer to enable the computer to perform the above method for transmitting data.

Through the above technical solutions, the size of the uplink transmission resource authorized in an msg2 (i.e., the first RAR message) can match the size of the to-be-transmitted uplink data.

BRIEF DESCRIPTION OF THE DRAWINGS

The accompanying drawings described here are used to provide a further understanding of the present disclosure and constitute a part of the present disclosure. The schematic embodiments of the present disclosure and the description thereof are used to explain the present disclosure, and do not constitute an improper limitation on the present disclosure. In the accompanying drawings.

DETAILED DESCRIPTION

The technical solutions in the embodiments of the present disclosure will be described below with reference to the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions according to the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figure 1:
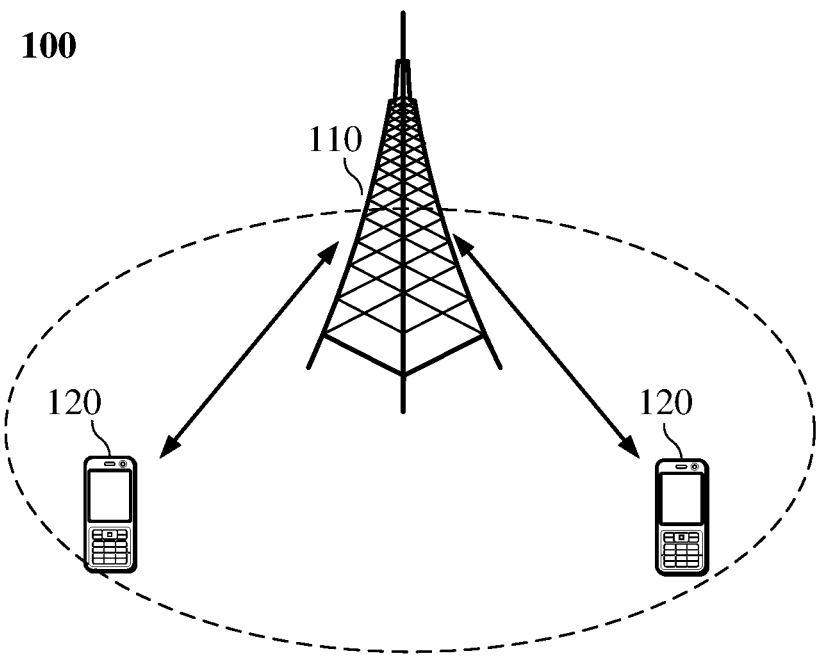
FIG. 1 is a schematic diagram of an architecture of a communication system provided by the embodiment of the present disclosure.

Exemplarily, a communication system 100 of the embodiment of the present disclosure is shown in FIG. 1. The communication system 100 may include a network device 110. The network device 110 may be a device communicating with a terminal 120 (or referred to as a communication terminal and a terminal). The network device 110 may provide communication coverage to a specific geographic region and may communicate with the terminal located within the coverage region. Optionally, the network device 110 may be a base transceiver station (BTS) in a GSM system or a CDMA system, or a nodeB (NB) in a WCDMA system, or an evolutionary node B (eNB or eNodeB) in an LTE system, or a wireless controller in a cloud radio access network (CRAN). Or, the network device may be a mobile switching center, a relay station, an access point, a vehicle device, a wearable device, a concentrator, a switch, a network bridge, a router, a network-side device in a 5G network, or a network device in public land mobile network (PLMN) that will be evolved in the future, and the like.

The communication system 100 further includes at least one terminal 120 located within the coverage range of the network device 110. The "terminal" used herein includes, but not limited to, connection via a wired line, such as connection via public switched telephone networks (PSTN), a digital subscriber line (DSL), a digital cable, and a direct cable, and/or another data connection/network, and/or via a wireless interface, for example, for a cellular network, a wireless local area network (WLAN), a digital television network such as a digital video broadcasting-handheld (DVB-H) network, a satellite network and an AM-FM broadcast transmitter, and/or an apparatus of another terminal, which is configured to receive/transmit a communication signal, and/or an Internet of Things (IoT) device. The terminal configured to realize communication through the wireless interface may be referred to as a "wireless communication terminal," a "wireless terminal," or a "mobile terminal." Examples of the mobile terminal include, but not limited to, a satellite or cellular phone, a personal communications system (PCS) terminal that may combine a cellular radiotelephone with data processing, facsimile, and data communications capability, a radiotelephone, a pager, an Internet/intranet access, a web browser, a notepad, a calendar, and/or a personal digital assistant (PDA) of a global positioning system (GPS) receiver, and a conventional laptop and/or palm-type receiver or other electronic apparatuses including radiotelephone transceivers. The terminal may refer to an access terminal, user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device, or other processing devices connected to a radio modem, a vehicle device, a wearable device, a terminal in the 5G network, or a terminal in the PLMN that will be evolved in the future, and the like.

Optionally, the terminals 120 may realize device to device (D2D) communication.

Optionally, the 5G system or 5G network may also be referred to as a new radio (NR) system or NR network.

FIG. 1 exemplarily illustrates one network device and two terminals. Optionally, the communication system 100 may include a plurality of network devices, and the coverage range of each network device may include other numbers of terminals, which is not limited in the embodiments of the present disclosure.

Optionally, the communication system 100 may also include other network entities such as a network controller and a mobile management entity, which is not limited in the embodiments of the present disclosure.

It should be understood that a device having a communication function in a network/system in the embodiment of the present disclosure may be referred to as a communication device. The communication system 100 shown in FIG. 1 is taken for example. The communication device may include a network device 110 and a terminal 120, which have communication functions. The network device 110 and the terminal 120 may be the above-mentioned specific devices, and descriptions thereof are omitted here. The communication device may also include other devices in the communication system 100, such as other network entities including the network controller and the mobile management entity, which is not limited in the embodiments of the present disclosure.

It should be understood that the terms "system" and "network" herein may often be interchanged herein. The term "and/or" herein is only an association relationship that describes associated objects and represents that there can be three relationships. For example, A and/or B can represent that: A exists alone, A and B exist simultaneously, and B exists alone. In addition, the character "/" herein generally represents that the front and back associated objects are in an "or" relationship.

In new radio (NR), the terminal may select a contention based random access (CBRA) process or a contention free random access (CFRA) process in a same random access (RA) process, specifically as follows:

1) When the terminal is configured with an exclusive physical random access channel (PRACH) resource, and when the terminal initiates an RA process when measured synchronization signal blocks (SSB, SS/PBCH block) do not satisfy a pre-configured threshold, the terminal initiates the CBRA process.

2) When the CBRA process fails, it is possibly because that the terminal does not correctly receive a random access response (RAR) message or a contention conflict is not solved, resulting in that the terminal re-selects a PRACH resource. During the selection of the PRACH resource, when an SSB satisfying the threshold exists, the terminal may select to initiate the CFRA process.

The terminal obtains an authorized uplink transmission resource (UL grant for short) from an msg2 of the CBRA. The UL grant is used to transmit an msg3. After the msg3 is transmitted, the terminal would store a media access control protocol data unit (MAC PDU) of the msg3 into an msg3 buffer. When the CBRA process fails, the terminal is switched to the CFRA process and obtains a UL grant from an msg2 of the CFRA process. However, the MAC PDU stored in the msg3 buffer cannot be transmitted due to the size of the UL grant, resulting in a switching failure of the RA process.

Figure 2:
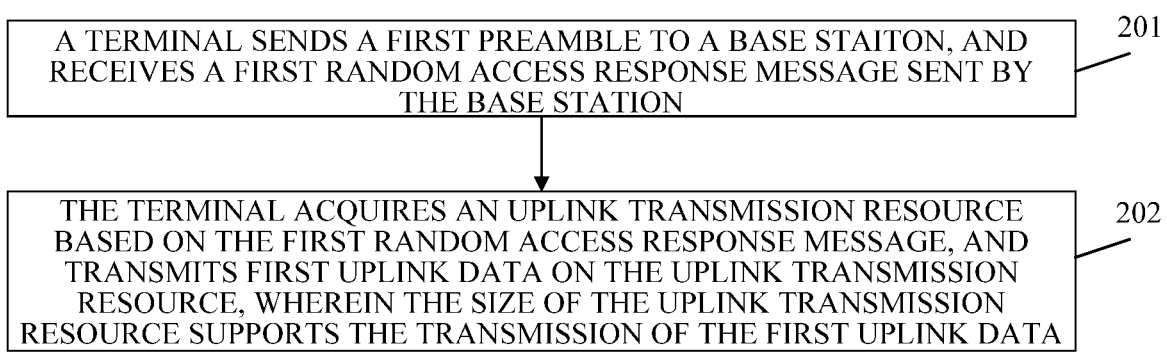
FIG. 2 is a flow diagram of a method for transmitting data provided by the embodiment of the present disclosure.

FIG. 2 is a flow diagram of a method for transmitting data provided by the embodiment of the present disclosure. As shown in FIG. 2, the method for transmitting data includes the following steps.

Step 201: A terminal transmits a first preamble to a base station and receives a first random access response (RAR) message transmitted by the base station.

In the embodiment of the present disclosure, the terminal is any device capable of communicating with a network, such as a mobile phone, a tablet computer, and a notebook computer.

In the embodiment of the present disclosure, the terminal performs a random access (RA) process to transmit the first preamble to the base station. The RA process here may be a contention free random access (CFRA) process or may be a contention based random access (CBRA) process.

The CFRA process includes four steps: 1) the terminal transmits a preamble (msg1) to the base station; 2) the base station transmits a RAR (msg2) to the terminal; 3) the terminal obtains a UL grant based on the RAR and transmits uplink data (msg3) to the base station on the UL grant; and 4) the base station transmits a contention resolution message to the terminal. The CFRA process includes two steps: before the two steps, the base station distributes a preamble (msg0) to the terminal, and then 1) the terminal transmits a preamble (msg1) to the base station, and 2) the base station transmits a RAR (msg2) to the terminal.

Step 202: The terminal obtains an uplink transmission resource based on the first RAR message and transmits first uplink data on the uplink transmission resource, where the size of the uplink transmission resource supports the transmission of the first uplink data.

In the embodiment of the present disclosure, after the terminal transmits the first preamble to the base station, the terminal monitors the RAR in a ra-response window and obtains the uplink transmission resource authorized by a network side from the RAR. The terminal transmits the first uplink data on the uplink transmission resource.

In the embodiment of the present disclosure, to ensure that the size of the uplink transmission resource supports the size of the to-be-transmitted first uplink data may be implemented through the following modes:

Mode I:

After obtaining the uplink transmission resource, the terminal checks a first buffer whether data is stored therein. The first buffer is an msg3 buffer and is configured to store a media access control protocol data unit (MAC PDU) in the msg3. When the first buffer has data stored therein, the terminal deletes data in the first buffer and obtains the to-be-transmitted MAC PDU from a multiplexing and assembly entity. The multiplexing and assembly entity here obtains data from different logic channels and generates a new MAC PDU according to a priority rule of the logic channels.

A downlink control channel of the first RAR message here is scrambled by a first radio network temporary identity (RNTI), and an RA process currently performed by the terminal is triggered by beam failure recovery (BFR). The first RNTI is other RNTIs in addition to a random access-radio network temporary identity (RA-RNTI), and the other RNTIs at least include a cell-radio network temporary identity (C-RNTI).

When the downlink control channel here that schedules the first RAR message is scrambled by the first RNTI (the first RNTI is other RNTIs in addition to the RA-RNTI, and the other RNTIs at least include the C-RNTI), and the RA process currently performed by the terminal is triggered by the BFR, the terminal deletes the data in the first buffer. In a specific implementation process, when the RA process currently performed by the terminal is triggered by the BFR, the terminal monitors a physical downlink control channel (PDCCH) in the ra-response window. When the PDCCH may be scrambled by the C-RNTI, a configured scheduling-radio network temporary identity (CS-RNTI) or other RNTIs, the terminal deletes the data in the first buffer.

The uplink transmission resource scheduled by the PDCCH is configured to transmit the MAC PDU obtained from the multiplexing and assembly entity.

For example, in the current RA process, when the PDCCH scrambled by the C-RNTI or the other RNTIs corresponding to the RAR (i.e., the first RAR message) schedules the UL grant, and the RA process is triggered by a BFR event, the terminal checks the msg3 buffer (i.e., the first buffer) whether data has been buffered. When the msg3 buffer has data therein, the terminal clears the msg3 buffer and obtains the to-be-transmitted MAC PDU from the multiplexing and assembly entity. The case that the msg3 buffer has data therein here means that when the UL grant is obtained from the RAR, at least one CBRA has occurred. The multiplexing and assembly entity here is in charge of uplink data packaging, i.e., a process of a link control protocol (LCP), and the MAC PDU obtained from this unit is newly transmitted data.

Mode II:

1) The terminal checks the first buffer whether data is stored therein, and the first buffer is configured to store the MAC PDU in the msg3.

2) When the first buffer has data stored therein, the terminal obtains data from the first buffer. The terminal deletes data in the first buffer after obtaining the data in the first buffer.

3.1) When the size of the obtained data is the same as the size of the uplink transmission resource, the terminal transmits the obtained data on the uplink transmission resource.

3.2) When the size of the obtained data is different from the size of the uplink transmission resource, the terminal assembles the MAC PDU through putting the obtained data into the multiplexing and assembly entity. The size of the assembled MAC PDU is the same as the size of the uplink transmission resource, and the terminal transmits the assembled MAC PDU on the uplink transmission resource.

It should be noted that there are two cases for the MAC PDU assembled by the multiplexing and assembly entity: 1, when the size of the uplink transmission resource is less than the size of the obtained data, the MAC PDU assembled by the multiplexing and assembly entity includes part of the obtained data; 2, when the size of the uplink transmission resource is greater than the size of the obtained data, the MAC PDU assembled by the multiplexing and assembly entity includes all of the obtained data and other possible data. The possible data here refers to a possible padding or possible MAC control element (CE), and the like.

The downlink control channel of the first RAR message is scrambled by the first RNTI, and the RA process currently performed by the terminal is triggered by the BFR. The first RNTI is other RNTIs in addition to the RA-RNTI, and the other RNTIs at least include the C-RNTI.

When the downlink control channel here that schedules the first RAR message here is scrambled by the first RNTI (the first RNTI is other RNTIs in addition to the RA-RNTI, and the other RNTIs at least include the C-RNTI), and the RA process currently performed by the terminal is triggered by the BFR, the terminal deletes the data in the first buffer.

Mode III:

1) The terminal checks the first buffer whether data is stored therein, and the first buffer is configured to store the MAC PDU in the msg3.

2) When the first buffer has data stored therein, the terminal obtains the to-be-transmitted MAC PDU from the multiplexing and assembly entity based on the data stored in the first buffer. The size of the to-be-transmitted MAC PDU is the same as the size of the uplink transmission resource, and the terminal transmits the to-be-transmitted MAC PDU on the uplink transmission resource.

For the mode II and the mode III, when the size of the data in the first buffer is greater than the size of the uplink transmission resource, then the terminal transmits a padding on the uplink transmission resource; or the terminal transmits part of the data in the first buffer on the uplink transmission resource; or the terminal transmits first indication information to the base station, the first indication information being configured to indicate that the size of the data in the first buffer is greater than the size of the uplink transmission resource; or a MAC layer entity of the terminal indicates a transmission failure of part or all of Radio Link Control protocol data units (RLC PDUs) included in the data in the first buffer to a Radio Link Control acknowledge mode (RLC AM) entity transmission side. The RLC AM entity transmission side retransmits part or all of the RLC PDUs after receiving the indication.

Mode IV:

After obtaining the uplink transmission resource, the terminal checks the first buffer whether data is stored therein. When the first buffer has data stored therein, the terminal obtains the data from the first buffer. The terminal obtains the data from the first buffer and determines the to-be-transmitted first uplink data based on the size of the data in the first buffer and the size of the uplink transmission resource. The first buffer is configured to store the MAC PDU in the msg3.

Further, when the downlink control channel that schedules the first RAR message is scrambled by a second RNTI (the second RNTI is an RA-RNTI), and the RA process currently performed by the terminal is not triggered by the BFR, the terminal obtains the data from the first buffer. In a specific implementation process, when the RA process currently performed by the terminal is not triggered by the BFR, for example, when the terminal needs to be switched to other cells to trigger the RA process, the terminal monitors the PDCCH in the ra-response window. When the PDCCH is scrambled by the RA-RNTI, the terminal obtains the data from the first buffer.

In the above solution, 1.1) when the size of the data in the first buffer is less than the size of the uplink transmission resource, the terminal re-assembles the MAC PDU as the first uplink data based on the data in the first buffer. The size of the re-assembled MAC PDU is the same as the size of the uplink transmission resource. The re-assembled MAC PDU here includes at least one of the following: a regular buffer state report (BSR), a padding BSR, a MAC CE corresponding to power headroom report (PHR), and a padding.

1.2) When the size of the data in the first buffer is greater than the size of the uplink transmission resource, then the terminal transmits the padding on the uplink transmission resource; or the terminal transmits part of the data in the first buffer on the uplink transmission resource; or the terminal transmits first indication information to the base station. The first indication information is configured to indicate that the size of the data in the first buffer is greater than the size of the uplink transmission resource.

For example, in the current RA process, when the PDCCH scrambled by the RA-RNTI corresponding to the RAR (i.e., the first RAR message) schedules a UL grant (i.e., a third uplink transmission resource), and the RA process is not triggered by the BFR event, the terminal checks the msg3 buffer (i.e., the first buffer) whether data has been buffered.

When the msg3 buffer has data therein, the terminal obtains the data, i.e., the MAC PDU, from the msg3 buffer. The terminal compares the size of the UL grant with the size of the MAC PDU.

1.1) When the size of the UL grant is greater than the size of the MAC PDU, the terminal re-assembles the MAC PDU, and the re-assembled MAC PDU may include any combination of the regular BSR, the padding BSR, the PHR MAC CE, and the padding until the newly assembled MAC PDU just fills the UL grant.

1.2) When the size of the UL grant is less than the size of the MAC PDU, the terminal performs any one of the following operations: the MAC PDU is not transmitted, and the UL grant is filled with the padding; part of the data of the MAC PDU is transmitted; one piece of indication information is transmitted to a network, which indicates that the MAC PDU stored in the msg3 buffer cannot be transmitted in the UL grant.

Mode V:

The terminal selects the first preamble from a plurality of preambles configured by a network side. The first preamble and a second preamble belong to a same preamble group, and the second preamble is a preamble selected in the RA process performed by the terminal in the last time.

For example, the preamble transmitted by the terminal in the current RA process and the preamble selected by the msg1 corresponding to the previous RA process need to be from the same preamble group. In this way, no matter what type the current RA process is, the size of the UL grant currently obtained by the terminal is consistent with the size of the UL grant obtained in the last time.

It is worth noting that the above mode III may be performed in combination with the mode I or the mode II or may be performed independently.

Figure 3:
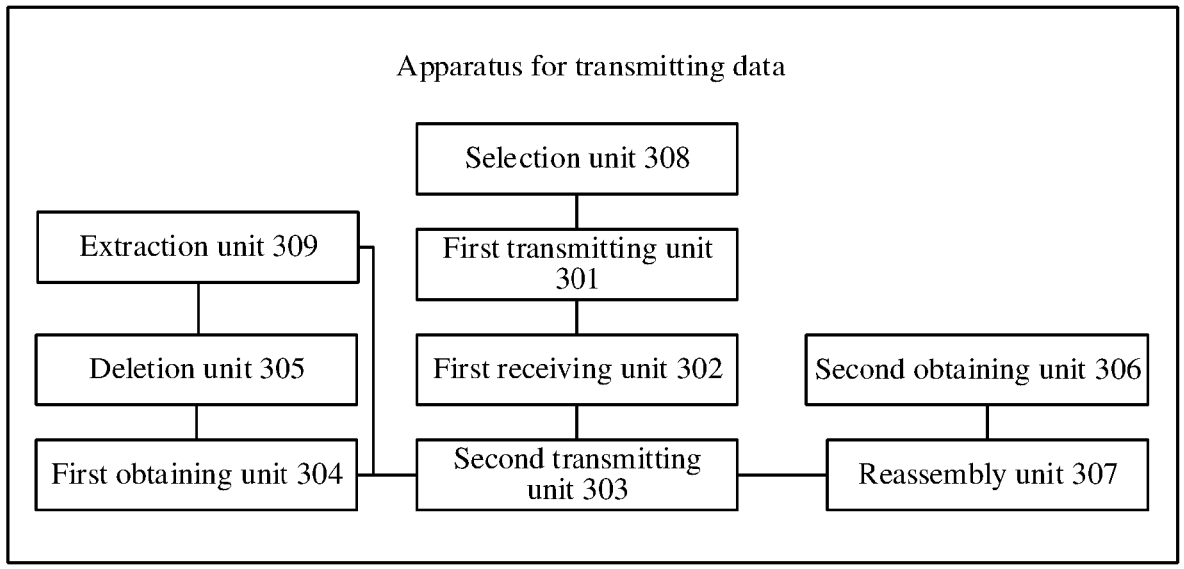
FIG. 3 is a schematic diagram of a structure constitution of an apparatus for transmitting data provided by the embodiment of the present disclosure.

FIG. 3 is a schematic diagram of a structure constitution of an apparatus for transmitting data provided by the embodiment of the present disclosure. As shown in FIG. 3, the apparatus includes a first transmitting unit 301, configured to transmit a first preamble to a base station; a first receiving unit 302, configured to receive a first random access response (RAR) message transmitted by the base station; and a second transmitting unit 303, configured to obtain an uplink transmission resource based on the first RAR message, and transmit first uplink data on the uplink transmission resource, where the size of the uplink transmission resource supports the transmission of the first uplink data.

In one implementation mode, the apparatus further includes a first obtaining unit 304, configured to obtain a to-be-transmitted media access control protocol data unit (MAC PDU) from a multiplexing and assembly entity as the first uplink data, where the multiplexing and assembly entity is configured to package newly transmitted uplink data into the MAC PDU.

In one implementation mode, the apparatus further includes a deletion unit 305, configured to check a first buffer whether data is stored therein. The first buffer is configured to store the MAC PDU in an msg3. When the first buffer has data stored therein, the deletion unit deletes data in the first buffer.

In one implementation mode, the apparatus further includes an obtaining unit 309, a deletion unit 305, and a reassembly unit 307.

The obtaining unit 309 is configured to check a first buffer whether data is stored therein. The first buffer is configured to store the MAC PDU in an msg3. When the first buffer has data stored therein, the obtaining unit obtains data from the first buffer.

After the obtaining unit 309 obtains the data in the first buffer, the deletion unit 305 deletes the data in the first buffer.

When the size of the obtained data is the same as the size of the uplink transmission resource, the second transmitting unit 303 transmits the obtained data on the uplink transmission resource. When the size of the obtained data is different from the size of the uplink transmission resource, the obtaining unit 309 assembles the MAC PDU through putting the obtained data into the reassembly unit. The size of the assembled MAC PDU is the same as the size of the uplink transmission resource, and the second transmitting unit 303 transmits the assembled MAC PDU on the uplink transmission resource.

In one implementation mode, the apparatus further includes an obtaining unit 309 and a reassembly unit 307.

The obtaining unit 309 is configured to check a first buffer whether data is stored therein. The first buffer is configured to store the MAC PDU in an msg3.

The first obtaining unit 304 is configured to obtain the to-be-transmitted MAC PDU from the reassembly unit based on data stored in the first buffer when the first buffer has data stored therein. The size of the to-be-transmitted MAC PDU is the same as the size of the uplink transmission resource.

The second transmitting unit 303 transmits the to-be-transmitted MAC PDU on the uplink transmission resource.

In one implementation mode, when the size of the data in the first buffer is greater than the size of the uplink transmission resource, the second transmitting unit is further configured to transmit a padding on the uplink transmission resource; or transmit part of the data in the first buffer on the uplink transmission resource; or transmit first indication information to the base station, the first indication information being configured to indicate that the size of the data in the first buffer is greater than the size of the uplink transmission resource; or, indicate a transmission failure of part or all of Radio Link Control protocol data units (RLC PDUs) included in the data in the first buffer to a Radio Link Control acknowledge mode (RLC AM) entity transmission side through a MAC layer entity of a terminal. The RLC AM entity transmission side retransmits part or all of the RLC PDUs after receiving the indication.

In one implementation mode, when a downlink control channel that schedules the first RAR message is scrambled by a first radio network temporary identity (RNTI), and a random access (RA) process currently performed by a terminal is triggered by beam failure recovery (BFR), the deletion unit 305 deletes the data in the first buffer. The first RNTI is other RNTIs in addition to a random access-radio network temporary identity (RA-RNTI), and the other RNTIs at least include a cell-radio network temporary identity (C-RNTI).

In one implementation mode, a downlink control channel of the first RAR message is scrambled by a first RNTI, and an RA process currently performed by a terminal is triggered by the BFR. The first RNTI is other RNTIs in addition to an RA-RNTI, and the other RNTIs at least include a C-RNTI.

In one implementation mode, the apparatus further includes:

a second obtaining unit 306, configured to obtain the data from a first buffer, and determine the to-be-transmitted first uplink data based on the size of the data in the first buffer and the size of the uplink transmission resource. The first buffer is configured to store a MAC PDU in an msg3.

In one implementation mode, the second obtaining unit 306 is configured to check the first buffer whether data is stored therein. When the first buffer has data stored therein, the terminal obtains the data from the first buffer.

In one implementation mode, the apparatus further includes:

a reassembly unit 307, configured to re-assemble the MAC PDU as the first uplink data based on the data in the first buffer when the size of the data in the first buffer is less than the size of the uplink transmission resource. The size of the re-assembled MAC PDU is the same as the size of the uplink transmission resource.

In one implementation mode, the re-assembled MAC PDU includes at least one of the following: a regular buffer state report (BSR), a padding BSR, a MAC CE corresponding to power headroom report (PHR), and a padding.

In one implementation mode, when the size of the data in the first buffer is greater than the size of the uplink transmission resource, then the second transmitting unit 303 transmits a padding on the uplink transmission resource; or, the second transmitting unit 303 transmits part of the data in the first buffer on the uplink transmission resource; or, the second transmitting unit 303 transmits first indication information to the base station, the first indication information being configured to indicate that the size of the data in the first buffer is greater than the size of the uplink transmission resource; or, a MAC layer entity of a terminal indicates a transmission failure of part or all of RLC PDUs included in the data in the first buffer to an RLC AM entity transmission side. The RLC AM entity transmission side retransmits part or all of the RLC PDUs after receiving the indication.

In one implementation mode, when a downlink control channel that schedules the first RAR message is scrambled by a second RNTI, and an RA process currently performed by a terminal is not triggered by the BFR, the second obtaining unit 306 obtains the data from the first buffer. The second RNTI is an RA-RNTI.

In one implementation mode, the apparatus further includes a selection unit 308, configured to select the first preamble from a plurality of preambles configured by a network side. The first preamble and a second preamble belong to a same preamble group, and the second preamble is a preamble selected in the RA process performed by the terminal in the last time.

Those skilled in the art should understand that the related descriptions of the above apparatus for transmitting data of the embodiment of the present disclosure may be understood by referring to the related descriptions of the method for transmitting data of the embodiment of the present disclosure.

Figure 4:
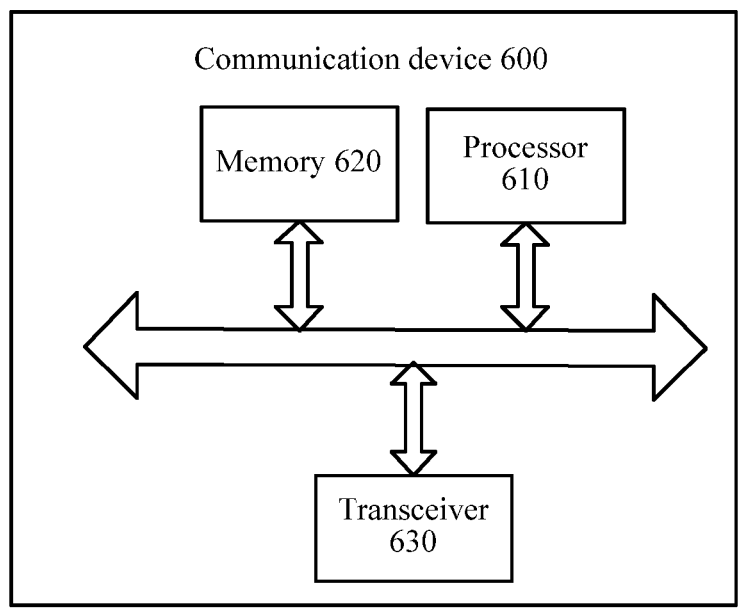
FIG. 4 is a schematic structural diagram of a communication device provided by the embodiment of the present disclosure.

FIG. 4 is a schematic structural diagram of a communications device 600 according to an embodiment of the present disclosure. The communications device 600 shown in FIG. 4 includes a processor 610. The processor 610 may invoke a computer program from a memory and run the computer program, to implement the method in the embodiments of the present disclosure.

Optionally, as shown in FIG. 4, the communications device 600 may further include a memory 620. The processor 610 may invoke the computer program from the memory 620 and run the computer program, to implement the method in the embodiments of the present disclosure.

The memory 620 may be a component independent of the processor 610 or may be integrated into the processor 610.

Optionally, as shown in FIG. 4, the communications device 600 may further include a transceiver 630. The processor 610 may control the transceiver 630 to communicate with another device, and specifically, to send information or data to another device, or receive information or data sent by another device.

The transceiver 630 may include a transmitter and a receiver. The transceiver 630 may further include an antenna. There may be one or more antennas.

Optionally, the communications device 600 may be the network device in the embodiments of the present disclosure, and the communications device 600 can implement corresponding procedures implemented by the network device in various methods in the embodiments of the present disclosure. For brevity, details are not described herein again.

Optionally, the communications device 600 may be the mobile terminal/terminal in the embodiments of the present disclosure, and the communications device 600 can implement corresponding procedures implemented by the mobile terminal/terminal in various methods in the embodiments of the present disclosure. For brevity, details are not described herein again.

Figure 5:
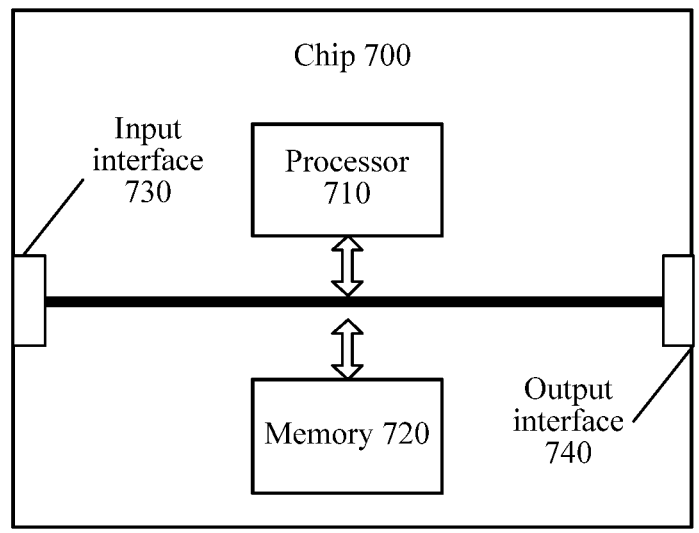
FIG. 5 is a schematic structural diagram of a chip of the embodiment of the present disclosure.

FIG. 5 is a schematic structural diagram of a chip according to an embodiment of the present disclosure. The chip 700 shown in FIG. 5 includes a processor 710. The processor 710 may invoke a computer program from a memory and run the computer program, to implement the method in the embodiments of the present disclosure.

Optionally, as shown in FIG. 5, the chip 700 may further include a memory 720. The processor 710 may invoke the computer program from the memory 720 and run the computer program, to implement the method in the embodiments of the present disclosure.

The memory 720 may be a component independent of the processor 710 or may be integrated into the processor 710.

Optionally, the chip 700 may further include an input interface 730. The processor 710 may control the input interface 730 to communicate with another device or chip, and specifically, the input interface 730 may obtain information or data sent by another device or chip.

Optionally, the chip 700 may further include an output interface 740. The processor 710 may control the output interface 740 to communicate with another device or chip, and specifically, the output interface 740 may output information or data to another device or chip.

Optionally, the chip may be applied to the terminal device in the embodiments of the present disclosure, and the chip can implement corresponding procedures implemented by the terminal device in various methods in the embodiments of the present disclosure. For brevity, details are not described herein again.

It should be noted that the chip mentioned in the embodiments of the present disclosure may also be referred to as a system-level chip, a system chip, a chip system, a system on chip, or the like.

Figure 6:
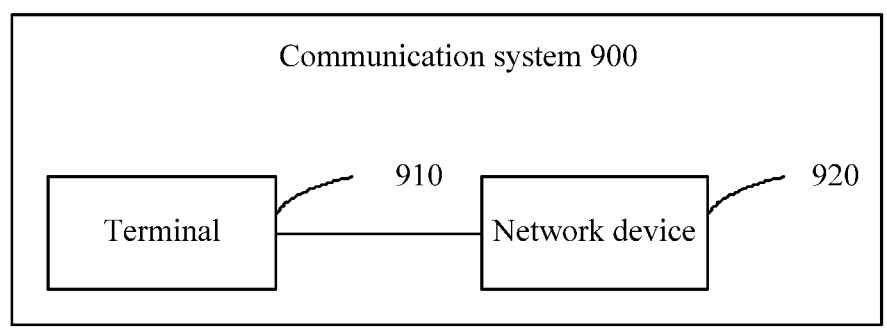
FIG. 6 is a schematic block diagram of a communication system provided by the embodiment of the present disclosure.

FIG. 6 is a schematic structural diagram of a communications device 900 according to an embodiment of the present disclosure. The communications device 900 shown in FIG. 8 includes a terminal 910 and a network device 920.

The terminal 910 can implement corresponding functions implemented by the terminal device in the foregoing method, and the network device 920 can implement corresponding functions implemented by the network device in the foregoing method. For brevity, details are not described herein again.

It should be understood that the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present disclosure may be directly performed and completed by means of a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). It should be noted that, the memory of the system and the method described in this embodiment of the present disclosure is intended to include but is not limited to these memories and any other suitable type of memory.

It should be understood that the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer-readable storage medium. The computer-readable storage medium is configured to store a computer program.

Optionally, the computer-readable storage medium may be applied to the network device in the embodiments of the present disclosure, and the computer program enables a computer to perform a corresponding procedure implemented by the network device in the methods of the embodiments of the present disclosure. For brevity, details are not described herein again.

Optionally, the computer-readable storage medium may be applied to the mobile terminal/terminal in the embodiments of the present disclosure, and the computer program enables the computer to perform a corresponding procedure implemented by the mobile terminal/terminal in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to perform a corresponding procedure implemented by the network device in the methods of the embodiments of the present disclosure. For brevity, details are not described herein again.

Optionally, the computer program product may be applied to the mobile terminal/terminal in the embodiments of the present disclosure, and the computer program instruction enables the computer to perform a corresponding procedure implemented by the mobile terminal/terminal in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to perform a corresponding procedure implemented by the network device in the methods of the embodiments of the present disclosure. For brevity, details are not described herein again.

Optionally, the computer program may be applied to the mobile terminal/terminal in the embodiments of the present disclosure, and when run on a computer, the computer program instruction enables the computer to perform a corresponding procedure implemented by the mobile terminal/terminal in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are performed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for transmitting data, comprising:
   transmitting, by a terminal, a first preamble to a base station;
   receiving, by the terminal, a first random access response (RAR) message transmitted by the base station;
   obtaining, by the terminal, an uplink transmission resource based on the first RAR message;
   transmitting, by the terminal, first uplink data on the uplink transmission resource, wherein a size of the uplink transmission resource supports the transmission of the first uplink data; and
   obtaining, by the terminal, a to-be-transmitted media access control protocol data unit (MAC PDU) from a multiplexing and assembly entity as the first uplink data, wherein the multiplexing and assembly entity is configured to package newly transmitted uplink data into the MAC PDU;
   wherein transmitting the first uplink data on the uplink transmission resource comprises:

checking a first buffer, by the terminal, whether data is stored therein, the first buffer being configured to store the MAC PDU in an msg3; and when the first buffer has data stored therein, obtaining data, by the terminal, from the first buffer;

when a size of the data in the first buffer is greater than the size of the uplink transmission resource, the method further comprising any one of the following steps: transmitting, by the terminal, a padding on the uplink transmission resource; transmitting, by the terminal, part of the data in the first buffer on the uplink transmission resource; transmitting, by the terminal, first indication information to the base station, the first indication information being configured to indicate that the size of the data in the first buffer is greater than the size of the uplink transmission resource; and indicating, by a MAC layer entity of the terminal, a transmission failure of part or all of Radio Link Control protocol data units (RLC PDUs) comprised in the data in the first buffer to a Radio Link Control acknowledge mode (RLC AM) entity transmission side, wherein the RLC AM entity transmission side retransmits part or all of the RLC PDUs after receiving the indication;

wherein when a downlink control channel that schedules the first RAR message is scrambled by a first radio network temporary identity (RNTI), and a random access (RA) process currently performed by the terminal is triggered by beam failure recovery (BFR), the terminal deletes the data in the first buffer; the first RNTI is other RNTIs in addition to a random access-radio network temporary identity (RA-RNTI), and the other RNTIs at least comprise a cell-radio network temporary identity (C-RNTI).

2. The method according to claim 1, wherein obtaining, by the terminal, the to-be-transmitted MAC PDU from the multiplexing and assembly entity comprises:

checking the first buffer, by the terminal, whether data is stored therein, the first buffer being configured to store the MAC PDU in the msg3; and when the first buffer has data stored therein, deleting, by the terminal, data in the first buffer, and obtaining the to-be-transmitted MAC PDU from the multiplexing and assembly entity.

3. The method according to claim 1, the method further comprising:

deleting, by the terminal, data in the first buffer after obtaining the data in the first buffer;

when the size of the obtained data is the same as the size of the uplink transmission resource, transmitting, by the terminal, the obtained data on the uplink transmission resource; and when the size of the obtained data is different from the size of the uplink transmission resource, assembling, by the terminal, the MAC PDU through putting the obtained data into the multiplexing and assembly entity, wherein the size of the assembled MAC PDU is the same as the size of the uplink transmission resource, and the terminal transmits the assembled MAC PDU on the uplink transmission resource.

4. The method according to claim 1, wherein transmitting the first uplink data on the uplink transmission resource comprises:

when the first buffer has data stored therein, obtaining the to-be-transmitted MAC PDU, by the terminal, from the multiplexing and assembly entity based on the data stored in the first buffer, wherein the size of the to-be-transmitted MAC PDU is the same as the size of the uplink transmission resource; and transmitting, by the terminal, the to-be-transmitted MAC PDU on the uplink transmission resource.

5. The method according to claim 1, the method further comprising:

obtaining data, by the terminal, from the first buffer; and determining the to-be-transmitted first uplink data based on the size of the data in the first buffer and the size of the uplink transmission resource, wherein the first buffer is configured to store the MAC PDU in the msg3.

6. The method according to claim 1, the method further comprising:

selecting, by the terminal, the first preamble from a plurality of preambles configured by a network side, wherein the first preamble and a second preamble belong to a same preamble group, and the second preamble is a preamble selected in the RA process performed by the terminal in the last time.

7. A terminal, comprising:

a processor; and a memory, wherein the memory is configured to store a computer program; the processor is configured to call and operate the computer program stored in the memory to:

transmit a first preamble to a base station;

receive a first random access response (RAR) message transmitted by the base station;

obtain an uplink transmission resource based on the first RAR message;

transmit first uplink data on the uplink transmission resource, wherein a size of the uplink transmission resource supports the transmission of the first uplink data;

obtain a to-be-transmitted media access control protocol data unit (MAC PDU) from a multiplexing and assembly entity as the first uplink data, wherein the multiplexing and assembly entity is configured to package newly transmitted uplink data into the MAC PDU;

check a first buffer whether data is stored therein, the first buffer being configured to store the MAC PDU in an msg3; and when the first buffer has data stored therein, obtain data from the first buffer;

wherein when a size of the data in the first buffer is greater than the size of the uplink transmission resource, the processor is further configured to perform any one of the following steps: transmit a padding on the uplink transmission resource; transmit part of the data in the first buffer on the uplink transmission resource; transmit first indication information to the base station, the first indication information being configured to indicate that the size of the data in the first buffer is greater than the size of the uplink transmission resource; or indicate a transmission failure of part or all of Radio Link Control protocol data units (RLC PDUs) comprised in the data in the first buffer to a Radio Link Control acknowledge mode (RLC AM) entity transmission side through a MAC layer entity of the terminal, wherein the RLC AM entity transmission side retransmits part or all of the RLC PDUs after receiving the indication;

wherein when a downlink control channel that schedules the first RAR message is scrambled by a first radio network temporary identity (RNTI), and a random access (RA) process currently performed by the terminal is triggered by beam failure recovery (BFR), the processor is further configured to delete the data in the first buffer; the first RNTI is other RNTIs in addition to a random access-radio network temporary identity (RA-RNTI), and the other RNTIs at least comprise a cell-radio network temporary identity (C-RNTI).

8. The terminal according to claim 7, wherein the processor is further configured to:
   check the first buffer whether data is stored therein, the first buffer being configured to store the MAC PDU in the msg3; and
   when the first buffer has data stored therein, delete data in the first buffer.

9. The terminal according to claim 7, wherein the processor is further configured to:
   after obtaining the data in the first buffer, delete data in the first buffer;
   when the size of the obtained data is the same as the size of the uplink transmission resource, transmit the obtained data on the uplink transmission resource;
   when the size of the obtained data is different from the size of the uplink transmission resource, assemble the MAC PDU through putting the obtained data into the multiplexing and assembly entity, the size of the assembled MAC PDU being the same as the size of the uplink transmission resource;
   and transmit the assembled MAC PDU on the uplink transmission resource.

10. The terminal according to claim 7, wherein the processor is further configured to:
    obtain the to-be-transmitted MAC PDU from the multiplexing and assembly entity based on data stored in the first buffer when the first buffer has data stored therein, wherein the size of the to-be-transmitted MAC PDU is the same as the size of the uplink transmission resource; and
    transmit the to-be-transmitted MAC PDU on the uplink transmission resource.

11. The terminal according to claim 7, wherein the processor is further configured to:
    obtain data from the first buffer; and
    determine the to-be-transmitted first uplink data based on the size of the data in the first buffer and the size of the uplink transmission resource, wherein the first buffer is configured to store the MAC PDU in the msg3.

12. The terminal according to claim 7, wherein the processor is further configured to:
    select the first preamble from a plurality of preambles configured by a network side, wherein the first preamble and a second preamble belong to a same preamble group, and the second preamble is a preamble selected in the RA process performed by the terminal in the last time.

* * * * *